United States Patent [19]

Austin et al.

[11] 4,286,087

[45] Aug. 25, 1981

[54] CHITIN POWDER AND PROCESS FOR MAKING IT

[75] Inventors: Paul R. Austin, Wilmington; Charles J. Brine, Newark, both of Del.

[73] Assignee: University of Delaware, Newark, Del.

[21] Appl. No.: 77,831

[22] Filed: Sep. 21, 1979

[51] Int. Cl.$^3$ .............................................. C08B 37/08
[52] U.S. Cl. ........................................ 536/20; 424/180
[58] Field of Search ........................... 536/20; 424/180

[56] References Cited

U.S. PATENT DOCUMENTS

| | | | |
|---|---|---|---|
| 2,783,148 | 2/1957 | Gyorgy et al. | 536/20 |
| 3,879,377 | 4/1975 | Austin | 536/20 |
| 3,892,731 | 7/1975 | Austin | 536/20 |
| 4,029,727 | 6/1977 | Austin et al. | 536/20 |
| 4,059,097 | 11/1977 | Casey | 536/20 |
| 4,063,016 | 12/1977 | Austin et al. | 536/20 |

*Primary Examiner*—Johnnie R. Brown

[57] ABSTRACT

A friable, dispersible microcrystalline chitin powder and a process of making same by treating particulate chitin at an elevated temperature with phosphoric acid, particularly with phosphoric acid diluted with a lower aliphatic alcohol, separating the treated chitin and subjecting same to shearing in an inert liquid medium until a uniform dispersion is obtained, thereafter separating the sheared chitin and drying and grinding same to a fine powder.

6 Claims, No Drawings

CHITIN POWDER AND PROCESS FOR MAKING IT

The Government of the United States has rights in this invention pursuant to Grant No. 04-7-158-44120 from the U.S. Department of Commerce.

This invention relates to chitin in the microcrystalline form.

Chitin is an aminocellulose derivative that occurs widely in nature, for example, in the cell walls of fungi, bovine cartilage, cuttlefish bone and the hard shells of insects and crustaceans. Waste from the shrimp, lobster, and crab seafood industries contain 10–30% chitin and are potentially important sources of chitin. It is a mucopolysaccharide, believed to be poly-N-acetyl-D-glucosamine, with an empirical formula $(C_8H_{13}O_5N)_n$ in which n may be any number from about 100 into the thousands range.

Microcrystalline cellulose, collagen and chitin are known in dispersion form and are useful as stabilizers in aqueous food systems which must resist the effects of repeated freeze-thaw and retort canning cyles. U.S. Pat. No. 3,847,897 describes a method for preparing partially hydrolyzed chitin and shearing it into a microcrystalline suspension. In the process of U.S. Pat. No. 3,847,897, as evidenced in Table I thereof, there is a drastic drop in viscosity and thus the very large amount of molecular degradation apparently occurring in the first 5 mins. of hydrolysis in aqueous HCl.

U.S. Pat. No. 4,063,016 (Example VII) describes stirring chitin with a 50:50 (by vol.) mixture of phosphoric acid and 2-propanol at room temperature, as one step in the preparation of a phosphate salt of chitin. Most of the chitin was soluble in that system. Hydrolysis was not mentioned, and apparently was prevented by the low temperature of the treatment.

Natural chitin has a levo (−) optical rotation, believed to be beneficial in certain uses. Especially for biological and physiological purposes, such as topical wound-healing treatments, it is recognized that the native—i.e., natural—conformation of a biopolymer usually is required (U.S. Pat. No. 3,632,754). Hence, there was a need for a method of preparing microcrystalline chitin which would not be harsh enough to alter the molecular conformation.

In summary, the prior art has not taught that microcrystalline, dispersible chitin powder can be made, especially of a predetermined molecular weight and natural molecular conformation.

OBJECTS

It is an object of this invention to provide an improved microcrystalline chitin. It is a further object to provide microcrystalline chitin in powder form. It is still a further object to provide friable, dispersible microcrystalline chitin powder. It is a further object to provide microcrystalline chitin of reduced molecular weight but of natural molecular conformation. Another object is to provide microcrystalline chitin of predetermined molecular weight by a reliable, reproducible process.

SUMMARY OF THE INVENTION

It has been found that a friable dispersible microcrystalline chitin powder, having natural molecular conformation and reduced molecular weight of any desired level, can be made by the following process. Particulated chitin is dispersed in a mixture of phosphoric acid and a lower aliphatic alcohol, preferably containing less than 50% by volume phosphoric acid, and heated to hydrolyze the chitin to the desired lower molecular weight. The hydrolyzed chitin is then separated from the liquid and washed several times with water to remove residual acid and alcohol and thereafter redispersed in 5 to 25% water where it is subjected to high speed shear forces. The water was removed from the dispersion by drying said sheared hydrolyzed chitin followed by grinding said dry chitin to the desired size.

The hydrolyzing step is preferably carried out by heating a mixture of phosphoric acid and 2-propanol at a boiling temperature for ½ to 1½ hrs. Prolonged boiling causes the chitin to caramelize and hence boiling over 2 hours is undesirable. After the boiling step, the soluble material is discarded and the hydrolyzed chitin physically reduced to a nearly dry condition before proceeding to the shearing step.

After removal of substantially all of the hydrolyzing solution, the substantially dry hydrolyzed chitin is dispersed in water by adding about 5 to 25% water and subjecting the mixture high speed shear forces such as obtained in a Waring Blendor at about 20,500 RPM. A uniform dispersion is usually obtained in 15 to 20 minutes. The shearing step is carried out at ambient temperature. Any phosphoric acid may be neutralized if desired and the sheared chitin can be washed essentially salt free before drying and grinding to a powder.

Freeze drying is preferred but other low temperature drying methods are suitable. Drum drying at low temperature or spray drying in a vacuum may also be used. The principal aspect of the drying step is to prevent formation of a horny, non-friable material.

Any dry grinding process may be used such as an impact mill, e.g., Wiley Mill, ball mill or roller mill. Grinding may be carried out until all particles pass a 10 mesh or finer U.S. Standard sieve. For many uses, it is preferred that the particles have a size of 250 microns or less, e.g., such that they pass through a 60 mesh U.S. Standard sieve. By this method a product is obtained that is particles of chitin characterized as agglomerates of needle-like microcrystals, as seen under a 600 power microscope. These particles are capable of being dispersed in water to form a stable dispersion by mere hand stirring.

If the molecular weight—i.e., average chain length—has not been reduced sufficiently by one boil and one shearing step, the treatment can be repeated, using a fresh bath of $H_3PO_4$ and 2-propanol. Both boiling and shearing contribute to chain shortening, so that it is possible to obtain the desired molecular weight by varying the severity of either or both steps. Three treatments with the hydrolyzing medium and shearing steps usually are required to reduce the molecular weight into the 5,000–10,000 range.

The preferred acid is 85% $H_3PO_4$ and the preferred hydrolyzing medium is about 33% by vol. $H_3PO_4$ (85%) and about 67% by vol. of 2-propanol. Larger proportions of 85% $H_3PO_4$ are operable, but their use reduces the molecular weight of chitin more rapidly, so that control of the process is less easily accomplished. Such mixtures also dissolve more of the chitin than desired, thus reducing the yield of microcrystalline powder. Ethanol and 1-propanol can be used instead of 2-propanol, but with less satisfactory results.

The microcrystalline chitin is further characterized in having phosphorus content in the polymeric molecule;

however, such content usually is less than 1%. The phosphorus is present as a phosphate in the polymer molecule.

A conventional preservative such as sorbic acid can be incorporated with the powder, if desired, to prevent mold-formation. Also, if desired, any of a variety of well-known dispersing agents such as carboxymethyl cellulose and various sorbitol derivatives can be added to the powder.

Chitin from various sources, such as red, blue, rock and king crabs, krill, lobsters, shrimp and other crustaceans can be used. Depending on the sources and on the purity of the chitin, response to the process of this invention varies somewhat. It is quite easy, nevertheless, to compensate for these variations and obtain the desired results.

Chitin prepared under mild conditions of decalcification and deproteinization and having a natural levo (−) optical rotation are preferred as starting materials. However, some commercial chitins have a dextro (+) optical rotation because of the severity of their method of preparation. Such chitins yield microcrystalline chitins having a dextro (+) optical rotation. Microcrystalline chitin of low molecular weight prepared by prolonged or multi-stage treatments of naturally levo chitin by the process of this invention may also be dextrorotatory. In either case these chitins may be converted to products having the natural levo (−) optical rotation by allowing the material to stand in a dimethylacetamide-lithium chloride solution for a period of time.

Molecular weight was calculated from intrinsic viscosity by the modified Staudinger equation: $[\alpha]kM_{vol}^a$, in which $[\alpha]$=intrinsic viscosity, $M_{vol} \approx M_w$=weight average molecular weight and K and $\alpha$ are constants ($8.93 \times 10^{-4}$ and 0.71, respectively). Intrinsic viscosity was determined using a Cannon-Fenske Viscometer (size 100) giving a solvent efflux time greater than 100 seconds. The temperature was maintained at 30.0° C. ($\pm 0.02°$) by a constant temperature bath. N,N-dimethylacetamide (DMAc)—5% LiCl was used as the solvent.

Optical activity was determined as follows: The observed rotation, $\theta$, of the chitin solutions was measured in N,N-dimethylacetamide (DMAc)—5% LiCl using a Polyscience Polarimeter Model SR6. The solutions were filtered through glass fiber filters before the rotations were observed. The rotations were measured to the nearest 0.1% and at two concentrations. The specific rotations were calculated by the following equation: $[\alpha]_D^T=\theta/lc$, where c—concentration in g/ml; l—cell length in decimeters; D—wavelength of light (D line of sodium lamp); T—temperature, 25° C.

A procedure for acetyl determination by hydrolysis as a measure of chemical integrity of the products was based on the hydrolysis of the acetyl groups by strong alkali, and the conversion of them to acetic acid. The acetic acid was distilled off as an azeotrope with water. The amount of acetic acid was determined by an acid-base titration.

The sample of chitin (approximately 0.01 g) was placed in a round bottom flask with 40 ml of 50% NaOH. The mixture was refluxed for 1.5 hours and was allowed to cool before being placed in an ice bath. After 0.5 hour in the ice bath, 25 ml of $H_3PO_4$ (conc. 85%) was added slowly to the flask.

The mixture was then fractionally distilled using a Vigreux column. As the distilling flask began to go dry, 15 ml of hot distilled water was added to the flask. This step was repeated until 250 ml of distillate was collected to insure that distillation of the acetic acid was complete.

Several aliquots (25 ml) of the distillate were titrated with 0.01 N NaOH using phenolphthalein as an indicator. The volume of titrant used for the aliquots was extrapolated to the total volume of the distillate collected.

The distillate was collected until the aliquots of the sample and a blank were equal. Finely divided filter paper (cellulose) was used as a blank. N-acetyl-glucosamine (NAG) was used as a standard and gave a value of 20.4 (21.2 calcd. for pure chitin). The percent acetyl of chitin was determined by the following equation (Lee, 1974), $$\frac{\text{ml 0.01N NaOH} \times 0.4305 \times 10^{-3} \times 100}{\text{weight of sample}} = \% CH_3CO$$

The following examples illustrate the best modes contemplated for carrying out the process of this invention.

EXAMPLE 1

A slurry of 150 g of chitin from brown shrimp (molecular weight about 800,000) in 475 ml of 85% $H_3PO_4$ and 1000 ml of 2-propanol was stirred mechanically while being heated gradually to boiling and held there for about 1½ hrs. It was then quenched with tap water (2.5 l.) and allowed to stand at room temperature for 15 mins.

The slurry was then centrifuged at 2000 RPM. After removal of the supernatant liquid, the chitin was washed twice with hot water and then once with acetone. After each wash, the slurry was centrifuged again and the supernatant liquid removed.

The chitin mixture thus obtained was filtered under suction to reduce the liquid content as much as possible, and then the damp solid was sheared for 15 minutes with about 10% its weight of water. Shearing was done in a Waring Blendor at 20,500 RPM, starting with the mixture at room temperature and allowing the temperature to rise from the heat generated by the shearing action. The resulting dispersion was spread evenly on trays and freeze-dried.

The dry cake of microcrystalline chitin was broken up and subjected to dry shearing at about 5000 RPM for about 2 minutes to create a particulate that could be fed into a laboratory Wiley mill. The chitin particulate was then ground in a Wiley laboratory mill until it passed through a 40 mesh U.S. Standard sieve.

The yield of white, microcrystalline chitin powder was 130 g. Its phosphorus content was about 0.4% and its molecular weight (wt. average) was about 75,000. It had an optical rotation of about −80°.

EXAMPLE 2

The procedure of Example 1 was iterated using the product of Example 1 as the starting material. A white microcrystalline chitin was obtained that had a molecular weight (wt. average) of about 33,600 and an optical rotation of about −10°.

EXAMPLE 3

The procedure of Example 1 was iterated using the product of Example 2 as the starting material. A white microcrystalline chitin was obtained that had a molecular weight (wt. average) of about 5,600 and an optical rotation of about +71°.

EXAMPLE 4

The procedure of Example 1 was repeated, using a 1:1 vol. ratio of 85% $H_3PO_4$ and 2-propanol. After only one boiling step and one shearing step, followed by neutralization with aqueous NaOH to pH 7.0, and drying, the molecular weight was found to be about 10,500, the acetyl value 19.7 and the phosphorus content 5.30%. The specific rotation of the soluble fraction of this material initially was (+) 50° and after standing for one week in dimethylacetamide −5% LiCl its specific rotation reverted to (−)25°.

EXAMPLE 5

Smooth, emollient creams based on commercial sorbitol products "Span 80," "Tween 20" and "Tween 60" were made from the water-sheared dispersion of Example 1 (before drying) by mixing two parts of the chitin dispersion with one part by weight of each sorbitol agent. The resulting emollient creams were physically stable and completely free from mold on standing several months at room temperature, in contrast to the 10% chitin dispersion itself, which developed a layer of mold within about one week when exposed to the air.

The powder of this invention is strikingly effective as a supplement to lactose-rich chicken diets, producing impressive gains in body weight and reductions in the diarrhea and scruffy feathers normally caused by lactose-rich whey feed (see Example IV of U.S. Ser. No. 051,850 filed June 25, 1979, by Austin, Zikakis and Brine).

EXAMPLE 6

The procedure of Example 1 was repeated using a chitin derived from the blue crab (initial molecular weight about $1 \times 10^6$). Employing 33% by vol. $H_3PO_4$ (85%) and about 67% by vol. 2-propanol, after only one boiling step and one shearing step the molecular weight was found to be about 84,500. Phosphorus content was 0.39%. The product had an optical rotation of about 0°.

Examples 1, 2 and 3 illustrate how the molecular weight of the microcrystalline chitin powder can be controlled. It is, of course, obvious that one need not go through the freeze dry and grinding to powder steps but one time, namely, as the final steps of making the chitin powder. The molecular weight of the final product can be controlled by repeating or varying the steps of phosphoric acid and alcohol treatment and the shearing of the damp solid resulting from said treatment.

Substantial improvements in both acceleration and quality of wound-healing have been demonstrated by applying water-dispersions of the powder of this invention to severe abrasions, cuts and cracks caused by chapping.

Thus, the microcrystalline chitin powder of this invention fills a need in the art. It is more convenient and economical to store and ship than the microcrystalline chitin dispersion of the prior art, and can be dispersed readily if desired. The process of this invention provides a reliable method for preparing this powder in any desired molecular weight in a range from about 450,000 down to about 5,000. Surprisingly, this can be accomplished without adverse effect on the chemical integrity of the polymer.

While particular examples of the present invention have been shown and described, it is apparent that changes and modifications may be made herein without departing from the invention in its broadest aspects. The aim of the appended claims, therefore, is to cover all such changes and modifications as fall within the true spirit and scope of the invention.

We claim:
1. A process of making a dispersible chitin powder which comprises the sequential steps of
   (a) dispersing a particulate chitin in a mixture of phosphoric acid and a lower aliphatic alcohol,
   (b) heating said dispersion to hydrolyze the chitin to the desired lower molecular weight,
   (c) removing the hydrolyzed chitin from the dispersion,
   (d) redispersing the hydrolyzed chitin in water by mixing same with 5 to 25% water and subjecting the mixture to high speed shear forces,
   (e) removing the water from the dispersion by drying said sheared hydrolyzed chitin,
   (f) grinding the dried sheared hydrolyzed chitin to the desired particle size.
2. The process of claim 1 in which the phosphoric acid in step (a) is present in an amount less than 50% by volume in the mixture of phosphoric acid and lower aliphatic alcohol.
3. The process of claim 1 in which the lower aliphatic alcohol is 2-propanol.
4. The process of claim 2 in which the mixture of phosphoric acid and lower aliphatic alcohol consists of 33 Vol. % of 85% $H_3PO_4$ and 67 Vol. % of 2-propanol.
5. The process of claim 1 which the drying process of step (e) is freeze drying.
6. The process of claim 4 in which the dispersion is phosphoric acid and 2-propanol is heated at boiling for ½ hr. to 1½ hrs.

* * * * *

UNITED STATES PATENT AND TRADEMARK OFFICE
CERTIFICATE OF CORRECTION

PATENT NO. : 4,286,087
DATED : August 25, 1981
INVENTOR(S) : Paul R. Austin and Charles J. Brine It is certified that error appears in the above—identified patent and that said Letters Patent is hereby corrected as shown below:

Column 2, line 23, the word ---to--- should follow "mixture"

Column 6, line 48, the word ---in--- should follow "Claim 1"

Column 6, line 50, "is" should read ---in---

Signed and Sealed this

Sixth Day of April 1982

[SEAL]

Attest:

Attesting Officer

GERALD J. MOSSINGHOFF
Commissioner of Patents and Trademarks